United States Patent [19]

Harris, III

[11] 4,183,152

[45] Jan. 15, 1980

[54] ELECTRICAL INDICATING DEVICE

[75] Inventor: John F. Harris, III, Franksville, Wis.

[73] Assignee: Western Publishing Company, Inc., Racine, Wis.

[21] Appl. No.: 920,516

[22] Filed: Jun. 29, 1978

[51] Int. Cl.² ............................................... G09B 7/06
[52] U.S. Cl. ...................................................... 35/9 C
[58] Field of Search ................................ 35/9 C, 9 D

[56] References Cited

U.S. PATENT DOCUMENTS

| | | | |
|---|---|---|---|
| 2,546,666 | 3/1951 | Fleischer | 35/9 C |
| 2,627,672 | 2/1953 | Polton | 35/9 C |
| 2,724,910 | 11/1955 | Kelly | 35/9 C |
| 3,141,244 | 7/1964 | Smith | 35/9 C |
| 3,177,595 | 4/1965 | Yonker et al. | 35/9 C X |
| 3,397,466 | 8/1968 | Stillit | 35/9 C |
| 3,478,441 | 11/1969 | Zadig | 35/9 C |
| 3,509,643 | 5/1970 | Kane | 35/9 C |
| 3,541,706 | 11/1970 | Shapiro | 35/9 C X |
| 3,621,590 | 11/1971 | Olynick | 35/9 C |
| 3,735,501 | 5/1973 | Ma | 35/9 C |
| 3,818,610 | 6/1974 | Baba et al. | 35/9 C |
| 3,835,553 | 9/1974 | Kirton et al. | 35/9 C |
| 3,947,978 | 4/1976 | Clark et al. | 35/9 D X |
| 3,973,334 | 8/1976 | Sterritt | 35/9 C X |
| 4,115,931 | 9/1978 | Futhey | 35/9 C |

*Primary Examiner*—William H. Grieb
*Attorney, Agent, or Firm*—Beveridge, De Grandi, Kline & Lunsford

[57] ABSTRACT

An electrical indicating device having an animal appearance with indicator lights, incorporated as a part of the features of the animal, to be energized to indicate selection of a right answer from among a number of possible answers. A casing is formed of two portions which cooperate to define a chamber. The outer configuration of the casing provides an animal appearance, with the indicator lights included as features of the animal. A mounting member fastened within the casing mounts circuitry including a probe that extends out of the casing. The probe includes an inner pin and a surrounding tube separated by an insulator. When the probe is touched to an electrically conductive area, the pin and tube are interconnected to complete the circuitry energizing the indicator lights.

1 Claim, 9 Drawing Figures

ELECTRICAL INDICATING DEVICE

The present invention pertains to an electrical indicating device having an animal appearance for indicating selection of a right answer from among a multiplicity of possible answers. More particularly, the present invention pertains to an animal-configuration indicating device having indicator lights incorporated as a part of the features of the animal to be energized to indicate to the user the selection of a correct answer from among several possible answers to a question.

Numerous teaching aids, such as books or other printed matter, include at various intervals a number of questions to aid the user in learning material presented in the teaching aid. While such questions can be presented at one page of a book with answers given at another page of the book, this is inconvenient in that it requires continual turning back and forth between the question page and the answer page. This results in loss of interest upon the part of the user. Additionally, the user frequently observes the correct answers to several questions at the time he turns to the answer page to check for the correct answer of one question, reducing the effectiveness of such a set of questions and answers as a teaching technique. Additionally, it is desirable to provide such a teaching aid in a form that does not encourage writing or other marking on the pages, since such marking reduces the re-usability of the book.

There have been developed teaching devices for purposes of self-examination which indicate correct answers without requiring repetitive turning back and forth of pages and without encouraging marking on the pages. Such devices, however, have not had as great a user appeal as might be desired, particularly among children. By way of example, U.S. Pat. No. 3,177,595 shows a teaching device providing multiple choice questions and an answer board having recesses at locations corresponding to the possible choices for the answers to each question. Each correct answer is provided with a relatively shallow recess in the answer board, while each incorrect answer is provided with a comparatively deep recess. The answering device includes a rod which is inserted into the recess of the selected answer. If the correct answer is selected, the bottom of the comparatively shallow recess pushes the rod upward, positioning a lever to index a wheel that counts correct answers. In contrast, if an incorrect answer is selected, the comparatively deep recess does not actuate the rod, and so the lever is retained in a position that results in indexing of a wheel which counts incorrect answers. This teaching device thus requires the user to remember the numbers indicated by the correct answer counting wheel and the incorrect answer counting wheel and to observe which number is changed in order to determine whether the selected answer is correct or incorrect. The device does permit modification to incorporate a light that is energized when a correct answer is given; however, failure of the light to be energized may be interpreted as a failure of the circuit rather than selection of the wrong answer, and so each time the user selects an answer and does not achieve lighting of the light, he likely will look at the incorrect and correct counters to assure himself that the answer he has selected is incorrect.

U.S. Pat. No. 3,947,978 shows an educational learning device in which electrical circuitry is incorporated into an answer card, and that circuitry is activated by depressing it with an answering tool. This requires complex and expensive answer cards.

U.S. Pat. No. 3,541,706 shows a writing and reading device for the visually handicapped in which the "writing" is coded in the base of a groove as a series of dots and dashes of electrically conductive material. A probe member having an oscillator circuit within it is moved through the groove at a uniform speed, and so as the probe is moved, the oscillator circuit is energized at intervals with each interval having a duration indicative of whether a dot or a dash has been encountered.

U.S. Pat. No. 3,141,244 shows an audio visual teaching device including a stylus having a pair of probes which are used to puncture the material of an answer sheet. If a correct answer is selected, once the probes puncture the top layer of the answer sheet, they encounter an electrically conductive material which closes a circuit to advance a slide projector or to cause other such changing of the teaching material. Obviously, once the answer sheet has been utilized, it cannot again be utilized because its top layer has been punctured by the probe.

U.S. Pat. Nos. 3,397,466, 3,478,441, and 3,509,643 likewise show teaching devices including probes which puncture one surface of the answer sheet to contact an electrically conductive material. These devices thus also result in the answer sheet being usable but a single time.

Each of U.S. Pat. Nos. 2,546,666, 2,724,910, 3,818,610, and 3,835,553 shows a teaching device including a probe which, when in contact with an electrically conductive material, closes a circuit to energize a light indicator. While the devices of these patents are usable with multiple choice types of questions, and permit reuse of the answer sheet, still they are of plain configuration and are not likely to attract the interest of the user, particularly a child.

The present invention is an electrical indicating device having an animal appearance with indicator lights, incorporated as a part of the features of the animal, to be energized to indicate selection of a right answer from among a plurality of possible answers. In accordance with the present invention, the electrical indicating device includes a casing member having a first portion and a second portion which cooperate to define a substantially enclosed chamber. The outer configuration of the casing members provide an animal appearance, and one or more indicator lights are provided which form features of the animal. A mounting member is provided within the enclosed chamber and fastened to one of the first and second portions of the casing member. A probe member extends from the mounting member through the casing member and includes an inner pin portion and a surrounding tube portion separated by an electrically insulating portion. Circuitry is mounted on the mounting member and electrically connected to the indicator light and to the probe and is responsive to electrical interconnection of the two portions of the probe to energize the indicator light. A book or other teaching aid is provided with a number of so-called multiple choice questions, each having associated with it a plurality of possible answers with a particular marking provided to correspond with each answer. The markings for the correct answers are formed of an electrically conductive material, while the marking for the incorrect answers are formed of a material that is not electrically conductive. Consequently, when the user selects a correct answer by contacting the probe with the electrically conductive printed material, the indicator lights, which form features of the animal configuration of the indicating device, are energized. This enables the student to immediately determine that he has selected a correct answer, and the animal configuration, with the indicating lights incorporated as features of the animal, retain the interest of the student, particularly of a child, for an extended period of time.

These and other aspects and advantages of the present invention are more apparent in the following detailed description and claims, particularly when considered in conjunction with the accompanying drawings, in which like parts bear like reference numerals. In the drawings:

Figure 1:
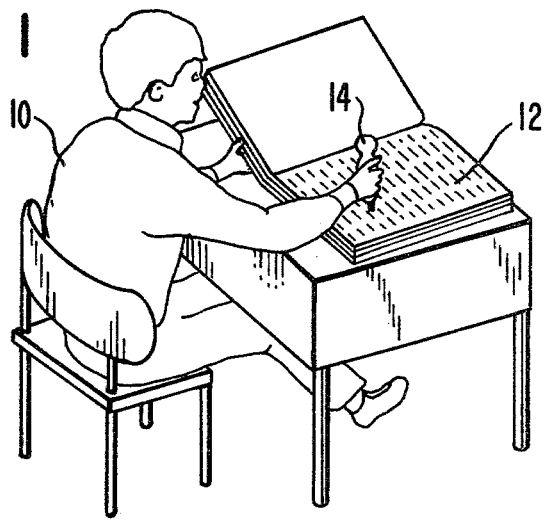
FIG. 1 is a perspective view of a person using an electrical indicating device in accordance with the present invention to indicate answers in a book or other printed material.

FIG. 1 depicts a person 10 utilizing a book 12 which might contain both instructional material and multiple choice questions. The person 10 utilizes an electrical indicating device 14 in accordance with the present invention to indicate his selected answers to these questions. Thus the person contacts the indication on book 12 associated with his selected answer with the tip of device 14, and if he has selected the correct answer, then indicator lights incorporated as a part of the features of the animal configuration of device 14 are energized.

Figure 2:
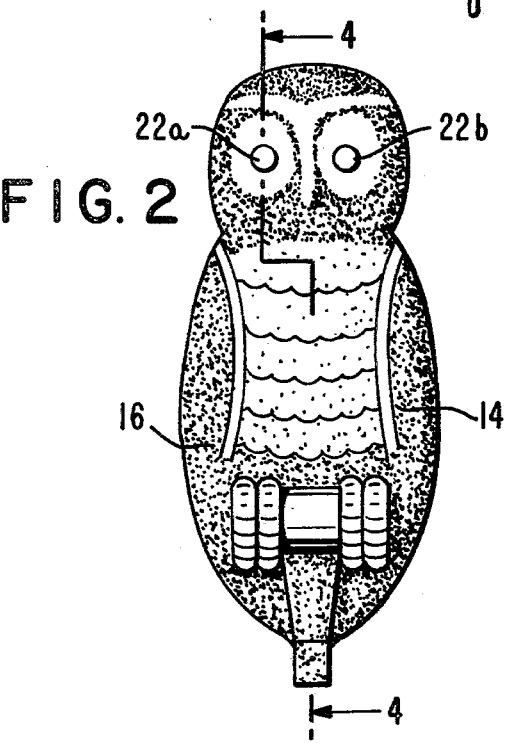
FIG. 2 is a front elevational view of one embodiment of an electrical indicating device in accordance with the present invention and having the configuration of an owl.
Figure 3:
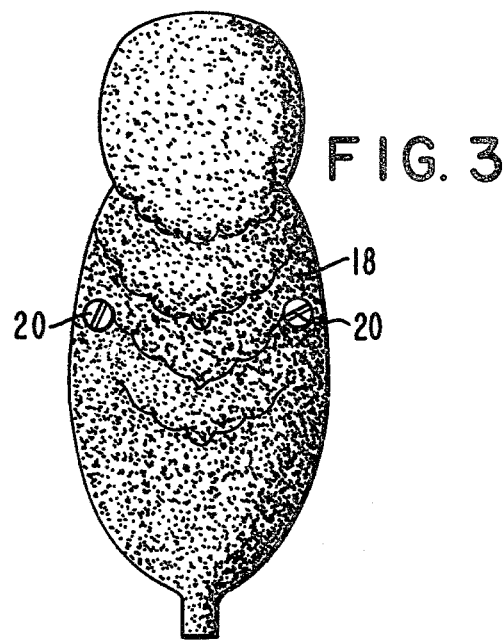
FIG. 3 is rear elevational view of the electrical indicating device of FIG. 2.

FIGS. 2 and 3, respectively, show the front and rear of a representative electrical indicating device 14 in accordance with the present invention. Thus, as seen in the FIGS. 2 and 3, this representative device is configured as an owl. The owl configuration is formed in an outer casing having a front portion 16, shown in FIG. 2, and a rear portion 18, shown in FIG. 3. Portions 16 and 18 are held together by suitable means such as screws 20 which pass through openings in rear portion 18 to threadedly engage on the interior of front portion 16.

As illustrated in FIG. 2, the eyes 22a and 22b of the owl take the form of indicator lights, for example light emitting diodes. The casing of device 14 terminates at its lower end in a probe portion 24 which is utilized by the user to contact the answer indicating portion of the book 12.

Figure 4:
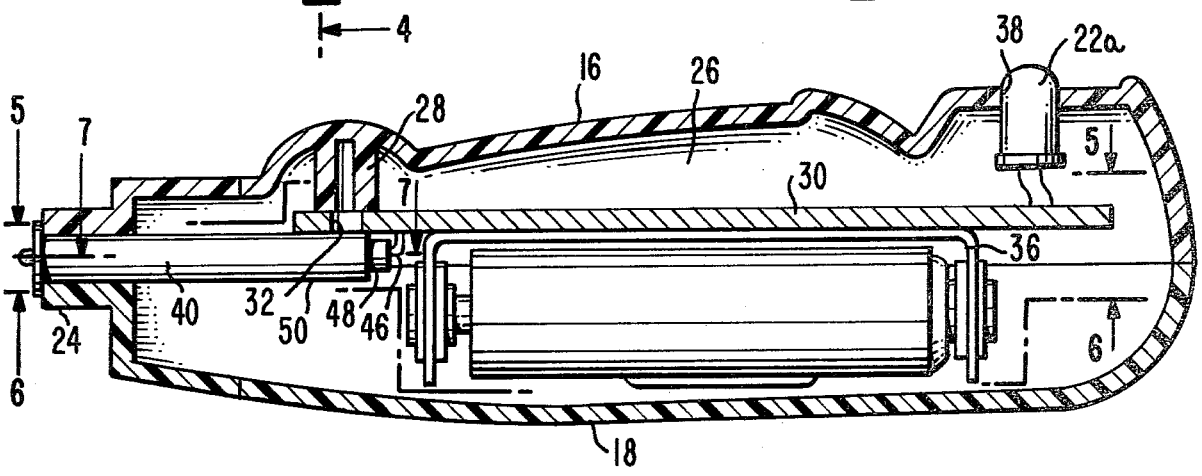
FIG. 4 is a sectional view taken along line 4—4 of FIG. 2.
Figure 5:
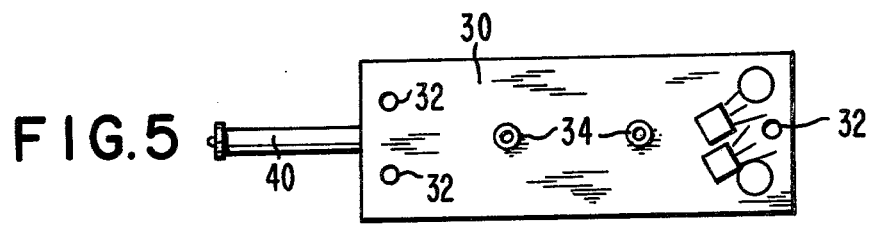
FIG. 5 is a sectional view taken along line 5—5 of FIG. 4.
Figure 6:
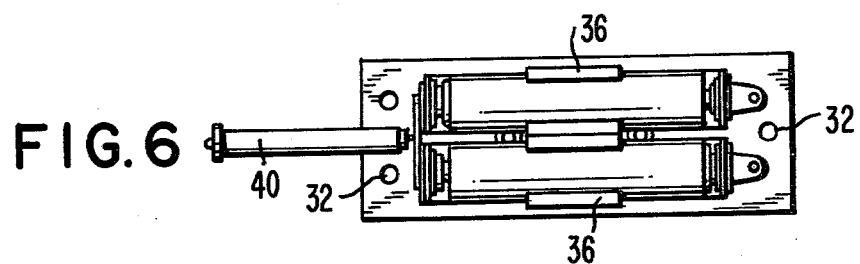
FIG. 6 is a sectional view taken along line 6—6 of FIG. 4.

FIG. 4 depicts the cavity 26 formed by front portion 16 and rear portion 18 of casing 14. The outer surface of portions 16 and 18 are, of course, configured as required to provide the appearance of the animal, illustratively depicted in the drawings as an owl. The casing might be formed by molding a suitable material such as a styrene. On the inner surface of front portion 16 a number of bosses 28 are formed to receive retaining members such as screws which attach a printed circuit board 30 to front portion 16. As depicted in FIG. 5, printed circuit board 30 is formed with openings 32 to align with bosses 28 for passage of the retaining members 32 therethrough. Additionally, printed circuit board 30 is provided with a pair of eyelets 34 which fasten battery clips 36 to one side of board 30, as depicted in FIGS. 4 and 6. The various circuit components required to permit operation of electrical indicating device 12 are mounted on printed circuit board 30, as illustrated in FIGS. 5 and 6. Light emitting diodes 22a and 22b are electrically connected to circuitry on printed circuit board 30 and are positioned to extend through openings 38 in front portion 16 to form the eyes of the owl, as seen from FIGS. 2 and 4.

Figure 7:
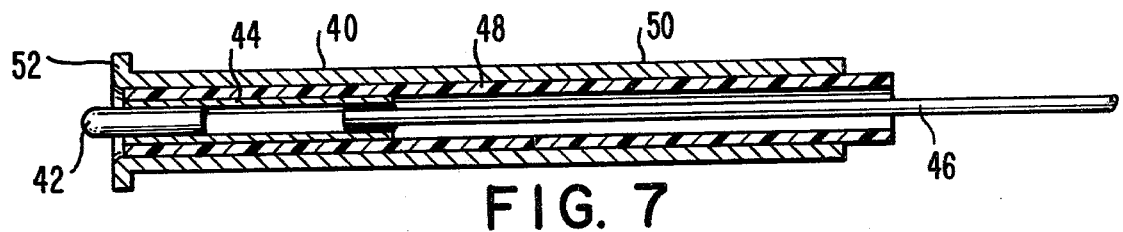
FIG. 7 is a sectional view taken along line 7—7 of FIG. 4.

A probe member 40 is mounted on printed circuit board 30 to extend through probe portion 24 of casing 14, as illustrated in FIG. 4. A first embodiment of probe member 40 is shown in detail in FIG. 7. An electrically conductive pin 42 is positioned by a force fit within an electrically conductive tube member 44 at one end of probe member 40. An electrically conductive wire 46 is fastened to tube member 44, for example by soldering, and extends out the second end of probe member 40. An electrically insulating tube 48, formed for example of a heat shrinkable synthetic material, surrounds electrically conductive tube 44 and wire 46. An outer electrically conductive tube 50 is fit over insulating tube 48. Preferably, the forward end of tube 50 is flared as depicted at portions 52. Pin 42 and outer tube 52 thus form two electrically conductive contacts of probe 40 and are electrically connected to other circuitry mounted on printed circuit board 30.

Figure 7A:
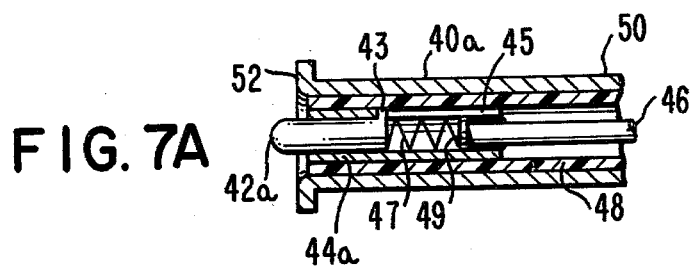
FIG. 7A is a sectional view similar to FIG. 7 but showing an alternative form of one component of an indicating device in accordance with the present invention.

FIG. 7A depicts a modified form of probe member 40a in which pin 42a is slidably retained in tube member 44a. Pin 42a includes a finger portion 43 which slides within a groove 45 in tube member 44a to prevent pin 42a from falling out of probe member 40a. Spring 47 acts against rear plug 49 on tube member 44a to bias pin 42a outwardly from tube member 44a. Thus, as the student indicates a selected answer with probe member 40a, pin 42a recedes into tube member 44a against the urging of spring 47 until both pin 42a and tube 50 contact the answer area selected by the student.

Figure 8:
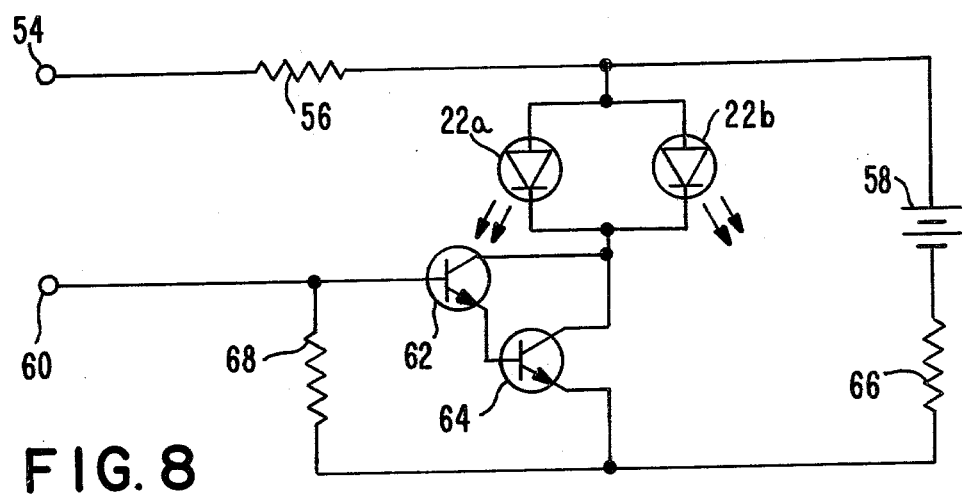
FIG. 8 is an electrical schematic diagram of circuitry suitable for incorporation into an electrical indicating device in accordance with the present invention.

FIG. 8 is a schematic diagram of an electrical circuit suitable for incorporation into an electrical indicating device in accordance with the present invention. First terminal 54 is connected to one end of resistor 56 which has its second end tied to the positive terminal of battery 58. Second terminal 60 is tied to the base of NPN transistor 62, the emitter of which is tied to the base of a second NPN transistor 64. Light emitting diodes 22a and 22b are connected in parallel with their anodes tied to the junction of resistor 56 and battery 58 and their cathodes tied to both the collector of transistor 62 and the collector of transistor 64. The emitter of transistor 64 is coupled to the negative terminal of battery 58 by resistor 66 and is coupled to terminal 60 by resistor 68. Electrically conductive pin 42 and electrically conductive tube 50 of probe member 40 are connected to the two terminals 54 and 60.

When probe member 40 is not contacting electrically conductive material, there is no electrical connection between terminal 54 and terminal 60, and so transistors 62 and 64 are cut off. As a consequence, no current flows through light emitting diode 22a and 22b, and so the indicator lights are not energized. When electrical contact is made between terminal 54 and terminal 60, for example by a student contacting an electrically conductive answer indication with the end of probe 40 so that that electrically conductive indication contacts both pin 42 and flared end 52 of tube 50, transistors 62 and 64 turn on. As a consequence, current flows through light emitting diodes 22a and 22b to energize the indicator lights which are incorporated as a part of the features of the animal of the electrical indicating device, illustrated in the drawings as the eyes of the owl. Accordingly, the student receives an indication that he has selected the correct answer.

The following components are utilized to form the best mode of the circuitry of FIG. 8 presently known to applicant, but the listing of them is not to indicate that other suitable components cannot be utilized:

| COMPONENT | DESCRIPTION |
|---|---|
| Resistor 56 | 1500 Ohms |
| Resistor 66 | 22 Ohms |
| Resistor 68 | 68,000 Ohms |
| Transistor 62 | 2N3904 |
| Transistor 64 | 2N3904 |
| LED 22a | CM4-84B-0 (red) |
| LED 22b | CM4-84B-O (red) |
| Battery 58 | 2-AAA batteries (total 3 Volts) |

By utilizing the electrical indicating device 12 of the present invention, in conjunction with a book having multiple choice questions with the correct answers indicated by an electrically conductive indication while the incorrect answers are indicated by an indication that is not electrically conductive, the student is readily able to determine whether he has selected the correct answers. Additionally, the animal appearance of the electrical indicating device aids in retaining the interest of the user, particularly a child.

What is claimed is:

1. An electrical indicating device comprising:
   a casing member having a first portion and a second portion, said first and second portions cooperating to define a substantially enclosed chamber, said casing member configured to provide an owl configuration;
   a printed circuit board within said chamber and fastened to one of said portions;
   a pair of light emitting diodes mounted within said chamber and visible through one of said portions to form the eyes of the owl;
   an electrically conductive elongated cylindrical tube member fixedly mounted on said printed circuit board and extending through said casing member;
   an electrically conductive elongated cylindrical pin member positioned within said tube member;
   an electrically insulating elongated cylindrical sleeve member surrounding said pin member and within said tube member to insulate said pin member from said tube member;
   spring means biasing said pin member outwardly from said tube member; and
   a solid state amplifier circuit mounted on said printed circuit board and electrically connected to said light emitting diodes, to said sleeve member and to said pin member and responsive to electrical interconnection of said sleeve member and said pin member to energize said light emitting diodes.

* * * * *